United States Patent
Egami et al.

(10) Patent No.: US 12,187,618 B2
(45) Date of Patent: Jan. 7, 2025

(54) SILICA PARTICLE DISPERSION LIQUID AND PRODUCTION METHOD THEREOF

(71) Applicant: JGC CATALYSTS AND CHEMICALS LTD., Kanagawa (JP)

(72) Inventors: Miki Egami, Kitakyushu (JP); Mitsuaki Kumazawa, Kitakyushu (JP); Ryo Muraguchi, Kitakyushu (JP); Michio Komatsu, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 526 days.

(21) Appl. No.: 17/029,716

(22) Filed: Sep. 23, 2020

(65) Prior Publication Data

US 2021/0094832 A1   Apr. 1, 2021

(30) Foreign Application Priority Data

Sep. 30, 2019 (JP) ................. 2019-180613

(51) Int. Cl.
| | | |
|---|---|---|
| *C01B 33/141* | (2006.01) | |
| *C09G 1/02* | (2006.01) | |
| *C09K 3/14* | (2006.01) | |

(52) U.S. Cl.
CPC .............. *C01B 33/141* (2013.01); *C09G 1/02* (2013.01); *C09K 3/1409* (2013.01); *C01P 2004/62* (2013.01); *C01P 2004/64* (2013.01); *C01P 2004/90* (2013.01); *C01P 2006/10* (2013.01)

(58) Field of Classification Search
CPC .............. C01B 33/141; C01P 2004/62; C01P 2004/64; C01P 2004/90; C01P 2006/10; C09G 1/02; C09K 3/1409
See application file for complete search history.

(56) References Cited

U.S. PATENT DOCUMENTS

| | | |
|---|---|---|
| 9,567,491 B2 | 2/2017 | Fu et al. |
| 2010/0071272 A1 | 3/2010 | Higuchi |
| 2011/0163262 A1 | 7/2011 | Higuchi et al. |
| 2015/0376462 A1 | 12/2015 | Fu et al. |

FOREIGN PATENT DOCUMENTS

| | | | |
|---|---|---|---|
| JP | 2000233377 A | | 8/2000 |
| JP | 2005060217 A | * | 3/2005 |
| JP | 2011-201719 A | | 10/2011 |
| JP | 2012-211080 A | | 11/2012 |
| JP | 2013-082584 A | | 5/2013 |
| JP | 2017524767 A | | 8/2017 |
| JP | 2019089692 A | | 6/2019 |
| WO | 2008-123373 A1 | | 10/2008 |
| WO | 2010-035613 A1 | | 4/2010 |

OTHER PUBLICATIONS

JP2005060217A trans (Year: 2005).*
Japanese Office Action mailed on Apr. 20, 2023, for the corresponding Japanese Patent Application No. 2019-180613.

* cited by examiner

*Primary Examiner* — Shuangyi Abu Ali
(74) *Attorney, Agent, or Firm* — Pearne & Gordon LLP (57) ABSTRACT

A silica particle dispersion liquid includes a silica particle that satisfies (i) to (iii) below: (i) an average particle diameter d is 5 to 300 nm; (ii) an occlusion amount of a basic substance per 1 g of the particle is 2 mg or more; and (iii) a Sears number Y exceeds 12.0.

6 Claims, 1 Drawing Sheet

SILICA PARTICLE DISPERSION LIQUID AND PRODUCTION METHOD THEREOF

CROSS-REFERENCE TO RELATED APPLICATION

This application claims priority from Japanese Patent Application No. 2019-180613 filed with the Japan Patent Office on Sep. 30, 2019, the entire content of which is hereby incorporated by reference.

BACKGROUND

1. Technical Field

An embodiment of the present disclosure relates to a silica particle dispersion liquid and a production method thereof.

2. Related Art

A silica particle dispersion liquid is useful for polishing a substrate of a metal wiring layer in a semiconductor integrated circuit, a silicon substrate, and the like. For obtaining a dispersion liquid containing a silica particle for polishing, which is a silica particle dispersion liquid, it has been a practice to densify the particle for hardening the entire particle in order to improve the physical polishing performance (mechanical polishing performance) of the particle (for example, see WO2008/123373, WO2010/035613, JP-A-2011-201719, JP-A-2012-211080, and JP-A-2013-082584).

However, it has been difficult to concurrently achieve the formation of a good polished surface (improvement of surface smoothness and reduction of defects). Therefore, there has been a long-standing demand for striking a balance between both the purposes which are in a trade-off relationship.

SUMMARY

A silica particle dispersion liquid comprising a silica particle that satisfies (i) to (iii) below: (i) an average particle diameter d is 5 to 300 nm; (ii) an occlusion amount of a basic substance per 1 g of the particle is 2 mg or more; and (iii) a Sears number Y exceeds 12.0.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a silica particle dispersion liquid as below. According to this silica particle dispersion liquid, a prescribed polishing rate can be retained, the surface smoothness (surface quality) of a polished substrate can be improved, and defects can be reduced.

As describe above, it has been considered that improving the physical polishing performance of the particle is effective for improving the polishing rate.

On the other hand, polishing of a silica substrate or the like is contributed by not only the above-described physical polishing effect due to hardening of the particle but also a chemical polishing effect due to etching with a basic substance formulated in a polishing composition. However, formulation of a large amount of a basic substance to a polishing composition (polishing liquid) led to over-etching in which etching of an entire substrate proceeds. This caused waviness of the polishing surface. Since this inevitably limited the formulation amount of a basic substance, the polishing effect due to a chemical polishing effect was limited.

Apart from a general concept that the physical polishing effect of the particle is effective for achieving a high polishing rate, the present inventors paid attention on the improvement of the polishing ability by chemical polishing, which has been limited. As a result, the inventors found that it is effective that a silica particle as a polishing particle has a particle structure in which a basic substance is sufficiently retained, and this basic substance is effectively discharged outside the particle during polishing. That is, when a silica particle has such a particle structure, a highly concentrated basic substance is directly provided from a silica particle as a polishing particle onto a polishing portion during polishing. This can improve a chemical polishing effect. Furthermore, according to this silica particle, the particle itself is relatively soft, and unnecessary etching is suppressed in a portion other than the polishing portion that comes into contact with the particle. This enables concurrent achievement of the formation of a good polished surface (improvement of surface smoothness and reduction of defects) and the retention of a prescribed polishing rate.

Furthermore, silica particles having a prescribed OH group (silanol group) on the surface can form an aggregate by optimizing an interaction between the silica particle and a water-soluble polymer. This aggregate is moderately larger than the silica particle. Therefore, the aggregate of the silica particles enables a high polishing rate. On the other hand, the particles in this aggregate have a relatively weak bonding strength. Therefore, the aggregate easily breaks in response to a strong force during polishing. Thus, according to the aggregate of the silica particles, the smoothness on a polished substrate can be ensured, and the occurrence of defects can be suppressed.

That is, an embodiment of the present disclosure relates to a silica particle dispersion liquid. A silica particle contained in this dispersion liquid satisfies (i) to (iii) below.

(i) An average particle diameter d is 5 to 300 nm.
(ii) An occlusion amount of a basic substance per 1 g of the particle is 2 mg or more.
(iii) A Sears number Y exceeds 12.0.

Further, an embodiment of the present disclosure relates to a production method of a silica particle dispersion liquid. The production method includes: preparing a silica particle dispersion liquid containing a silica particle having an average particle diameter d of 5 to 300 nm by hydrolyzing and polycondensing alkoxysilane in the presence of water, an organic solvent, and an alkali catalyst; substituting the organic solvent in the silica particle dispersion liquid with water; heating, under normal pressure at pH 7 or more, the silica particle dispersion liquid obtained by substituting with water such that the Sears number Y of the silica particle does not become 12.0 or less; and concentrating, at less than pH 7, the dispersion liquid obtained by heating.

According to a silica particle dispersion liquid according to an embodiment of the present disclosure, formation of a good polished surface (improvement of surface smoothness and reduction of defects) can be achieved while retaining a prescribed polishing rate.

[Silica Particle Dispersion Liquid]

In a silica particle dispersion liquid according to an embodiment of the present disclosure, a silica particle contained in the dispersion liquid satisfies (i) to (iii) below.

(i) An average particle diameter d is 5 to 300 nm.
(ii) An occlusion amount of a basic substance per 1 g of the particle is 2 mg or more.
(iii) A Sears number Y exceeds 12.0.

Figure 1:
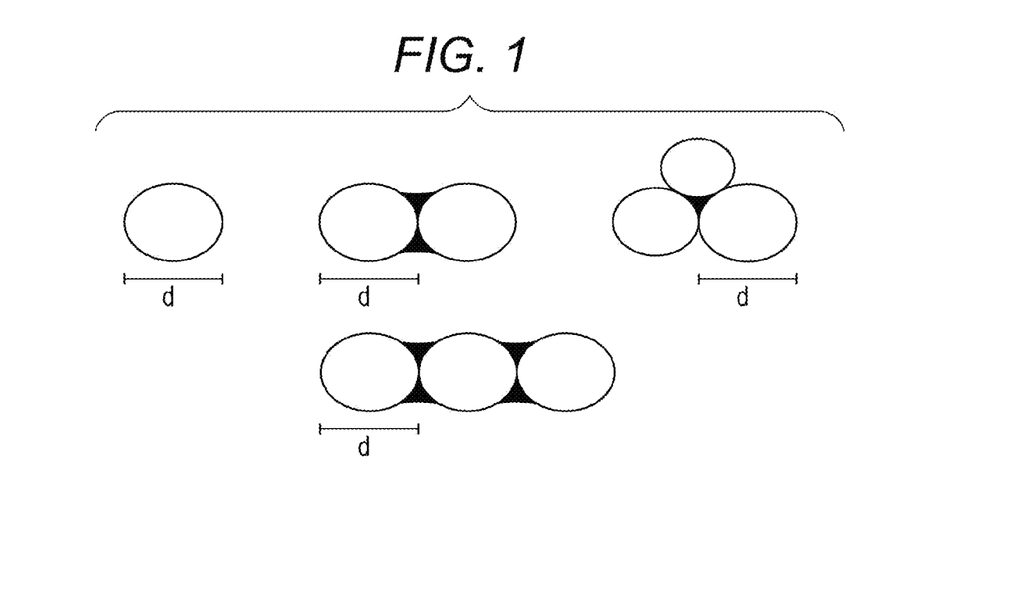
FIG. 1 is a diagram illustrating a calculation method of an average particle diameter in an embodiment of the present disclosure, in which a portion painted in black is an image of a connection portion between particles, and the connection portion may contain a space.

The silica particle has an average particle size d of 5 to 300 nm. This average particle diameter d can be obtained by taking an electron micrograph of the silica particle, measuring the longest primary particle diameter for each of optional 100 particles as illustrated in FIG. 1, and calculating an average of the measured longest diameters.

When the average particle diameter d of the silica particle is less than 5 nm, stability of the dispersion liquid is insufficient. Also, since the primary particle diameter is excessively small in this case, the polishing rate of the silica particle as a polishing composition is also insufficient. Conversely, when the average particle diameter d exceeds 300 nm, scratches occur on a polished substrate. Accordingly, a desired smoothness may not be obtained. The average particle diameter d is preferably 5 to 100 nm, more preferably 10 to 80 nm, further preferably 20 to 60 nm, particularly preferably 25 to 55 nm, and most preferably 30 to 50 nm.

The silica particle has a pore that occludes a basic substance. That is, the silica particle has a structure in which the surface of the particle communicates with the pore inside the particle. In this silica particle, the saturated occlusion amount of a basic substance per 1 g of the particle is 2 mg or more, and preferably 2.5 mg or more. Although the upper limit thereof is not particularly limited, it is, for example, 5.0 mg. When the saturated occlusion amount of a basic substance per 1 g of the particle exceeds 5.0 mg, the particle is excessively soft and therefore sometimes inappropriate as a polishing particle.

When the silica particle has the pore to occlude a basic substance (the saturated occlusion amount of a basic substance per 1 g of the particle is 2 mg or more) in this manner, the occluded basic substance is discharged outside the particle during polishing. This directly provides the polishing portion with a highly concentrated basic substance. As a result, chemical polishing is effectively promoted. A basic compound present on the particle surface significantly contributes to chemical polishing. Furthermore, the basic substance held inside the particle is also extruded due to a pumping effect by a pressing force between a substrate and a polishing pad, and the extruded basic substance contributes to chemical polishing. In addition, this silica particle has many pores and is thus relatively soft. Also, since a basic substance is not formulated to a polishing composition more than necessary, unnecessary etching is suppressed in a portion other than the polishing portion. This concurrently enables the formation of a good polished surface (improvement of surface smoothness and reduction of defects) and the achievement of a prescribed polishing rate.

This occlusion amount of a basic substance per 1 g of the silica particle (hereinafter, sometimes merely referred to as the "particle") denotes an occlusion amount in a dispersion liquid having a silica concentration of 9% by mass and a pH of 9 (equilibrium). Such an occlusion amount can be specifically calculated as follows. It is noted that the silica particle dissolves when a large amount of a basic substance is added, which disables measurement. Therefore, in the present embodiment, the following measurement method is used.

A silica particle aqueous dispersion liquid (silica concentration: 20% by mass, pH 6 to 8) is added with water and ammonia water to prepare a slurry having a silica concentration of 9% by mass and a pH of 9. After the addition of ammonia, time is taken until the pH is stabilized. Therefore, preparation is performed over one day. The silica particle in the slurry is centrifuged. Thereafter, the ammonia amount in the slurry (before centrifugation) and the ammonia amount in the supernatant are quantified. A difference between these amounts is obtained as the amount of ammonia adsorbed by the particle.

Examples of the basic compound include ammonia, amine, alkali metal hydrides, alkali earth metal hydrides, alkali metal hydroxides, alkali earth metal hydroxides, quaternary ammonium compounds, and amine-based coupling agents. Among these, ammonia is suitable, because it increases the polishing performance such as smoothness of a substrate, is easily washed during polishing, and is less likely to remain on a substrate. These basic compounds can be used independently or in combinations.

The Sears number Y of the silica particle has a value exceeding 12.0. Here, the Sears number is an index that denotes the amount of an OH group (silanol group) of the silica particle. When the Sears number Y exceeds 12.0, the amount of an OH group present on the particle increases. Therefore, the amount of the basic substance adsorbed on the particle surface increases. Accordingly, when the Sears number Y exceeds 12.0, the chemical polishing performance of the silica particle can be improved. Also, the silica particles can form an aggregate suitable for polishing by optimizing an interaction between an OH group on the silica particle surface and a water-soluble polymer formulated to a polishing composition. This aggregate is moderately larger than the silica particle. Therefore, the aggregate of the silica particles can achieve a high polishing rate. On the other hand, the particles in this aggregate have a relatively weak bonding strength. Therefore, the aggregate easily breaks in response to a strong force during polishing. Thus, according to the aggregate of the silica particles, the smoothness on a polished substrate can be ensured, and the occurrence of defects can be suppressed.

Here, the Sears number Y of the silica particle is preferably more than 12.0 and not more than 20.0, more preferably more than 12.0 and not more than 18.0, and further preferably more than 12.0 and not more than 16.0. When the Sears number Y is within such a range, the polishing rate can be further improved. That is, a silica particle having such a Sears number Y has a certain hardness. Therefore, this silica particle can ensure physical polishing performance while carrying a larger amount of a basic substance on the surface. Thus, this silica particle can ensure higher chemical polishing performance. The silica particle having a Sears number Y exceeding 20 according to the present embodiment is a relatively soft particle, which is more advantageous to the formation of a good polished surface than to the improvement of a polishing rate. Therefore, the silica particle of the present embodiment is useful for finish polishing.

The Sears number Y is measured by titration with sodium hydroxide as described by Sears in Analytical Chemistry 28(1956), 12, 1981-1983. According to this measurement method, the amount of an OH group on the particle surface (outside the pore) is measured.

Specifically, 30 g of sodium chloride is added to 150 g of a silica particle dispersion liquid diluted with pure water to achieve a silica particle concentration of 1% by mass. To the obtained product, hydrochloric acid is further added to adjust the pH to 4.0. Thereafter, the silica particle dispersion liquid is titrated with a 0.1 N aqueous sodium hydroxide solution at 0.1 ml/s. The Sears number Y is expressed by the titration amount of the aqueous sodium hydroxide solution used for the silica particle dispersion liquid to reach pH 9.0.

That is, the Sears number Y is the titration amount of a 0.1 N NaOH aqueous solution that is necessary to 1.5 g of silica. It can be said that this Sears number Y takes account of the behavior of the entirety of the silica particles contained in a polishing composition.

The density $\rho$ of the silica particle is preferably 1.00 g/cm$^3$ or less. When the density $\rho$ of the silica particle is 1.00 g/cm$^3$ or less, sufficient pores are formed inside the particle. Therefore, the particle can retain a desired basic compound. The density $\rho$ is more preferably 0.6 g/cm$^3$ or less. The lower limit thereof is preferably about 0.1 g/cm$^3$ in consideration of a polishing effect (strength of the particle).

Here, the density $\rho$ is calculated from a volume calculated from an average particle diameter d obtained from an electron micrograph and a specific surface area SA based on a Sears number Y.

The specific surface area SA based on the Sears number Y is calculated according to the following Formula 1 as described by Sears in Analytical Chemistry 28(1956), 12, 1981-1983.

$$SA = 32 \times (\text{Sears number}) - 25 \quad \text{[Formula 1]}$$

The sphericity of the silica particle is preferably 0.80 to 1.00. When the shape of the silica particle is a true sphere or closer to a true sphere, the smoothness of the polished surface improves, and the occurrence of defects can be suppressed. Therefore, the sphericity is more preferably 0.90 to 1.00, and particularly preferably 1.00.

The sphericity of the silica particle is obtained in the following manner. First, an electron micrograph of silica particles is taken. Next, a ratio (DS/DL) between a largest diameter (DL) and a short diameter (DS) orthogonal to a largest diameter (DL) is obtained for each of optional 100 particles. Furthermore, an average value of the ratios (DS/DL) is calculated to obtain the sphericity. The sphericity of the silica particle is calculated from unlinked particles.

The coefficient of variance (CV value) for the particle diameter of the silica particle is preferably 10% or less. When the CV value exceeds 10%, scratches occur on a polished substrate. Therefore, a desired smoothness may not be obtained. When the particle diameters of the silica particles in a polishing composition are identical, the smoothness of the polished surface is improved, and the occurrence of defects is suppressed. Therefore, the CV value is preferably 8% or less, and more preferably 6% or less.

The dispersion liquid according to the present embodiment may include a linked particle that is constituted by two or more silica particles linked to each other. Since a linked particle constituted by two silica particles has only a small influence on the surface of the polished substrate and can be expected to increase the polishing rate, it preferably accounts for 10% or more of the total number of the silica particles. When the aggregate breaks during polishing, such a linked particle constituted by two silica particles is likely to turn sideways in such a manner as to contact with the polished substrate. Therefore, defects are less likely to occur on the polished substrate, and the contact surface area with the polished substrate increases. This improves the polishing rate. The content ratio of the linked particle constituted by two silica particles is more preferably 20% or more.

The content ratio of the linked particle is obtained in the following manner. First, an electron micrograph of silica particles is taken. Next, the existence or absence of linkage is checked for optional 100 particles. The checked 100 particles are grouped into an unlinked particle, a linked particle constituted by two silica particles, and a linked particle constituted by three or more silica particles. For each group, the number of particles is counted, and the ratio of each group to the total number of particles is calculated.

In the silica particle, it is preferable that the content of each of alkali metal, alkali earth metal, Fe, Ti, Zn, Pd, Ag, Mn, Co, Mo, Sn, Al, and Zr is less than 0.1 ppm, the content of each of Cu, Ni, and Cr is less than 1 ppb, and the content of each of U and Th is less than 0.3 ppb. These metal elements are an impure content and preferably also not contained in the dispersion liquid. With a polishing material including a dispersion liquid containing these elements in an amount larger than the above-described amounts, the elements remain on the substrate in some cases. In such a case, there may be an increase in impedance of a metal wiring, a delay in response speed, an increase in power consumption, and the like. Also, since these element ions move (disperse), the above-described failures may be caused when the use condition is harsh or when the use extends for a long period. Especially, when U and Th, which generate radiation, remains even in trace amounts, malfunction of a semiconductor may be caused. It is noted that alkali metal includes Li, Na, K, Rb, Cs, and Fr. Alkali earth metal includes Be, Mg, Ca, Sr, Ba, and Ra.

The silica particle concentration in the dispersion liquid is, for example, 12% by mass or more, preferably 15% by mass or more, and more preferably 20% by mass or more. Although the upper limit of the silica particle concentration is not particularly limited, it is, for example, 40% by mass.

The amount of a "silicon-containing compound" (unreacted product) other than the silica particle present in the dispersion liquid is preferably 200 ppm or less. The smaller the amount of the "silicon-containing compound", the smaller the amount of a product adhering to the substrate. Also, when the amount of the "silicon-containing compound" is small, the adsorption of various chemical agents added to a polishing material and the reaction with various chemical agents are suppressed. Therefore, the effects of various chemical agents can be exerted.

This "silicon-containing compound" encompasses a compound of which reaction has not proceeded to an intended silica particle. Examples thereof include unreacted raw alkoxysilanes and low-molecular hydrolysates (oligomers and microgels) thereof.

[Polishing Composition (Polishing Material)]

The above-described silica particle dispersion liquid according to the present embodiment can be used as a polishing composition by adding another component such as a water-soluble polymer or appropriately using the silica particle in the dispersion liquid for preparation. The polishing composition may contain, other than the silica particle and the water-soluble polymer, additives such as a basic compound, a pH adjuster, a surfactant, and a chelator.

The silica particle interacts with the water-soluble polymer in the polishing composition, which improves the polishing effect of the silica particle. The silica particle used in the present embodiment has both a high Sears number Y and a high interaction with the water-soluble polymer. Therefore, the amount of the water-soluble polymer to be added is preferably smaller than the known amount.

Although the optimum range of the formulation amount of the water-soluble polymer varies depending on the type of the water-soluble polymer compound, it is preferably 0.0005 to 5% by mass relative to the total amount of the polishing composition. Also, this range is preferably 0.005 to 40% by mass relative to the silica particle. When the formation amount of the water-soluble polymer is within this range, replacement of the polishing composition in a polishing pad is smoothly performed. Therefore, a high polishing rate and the formation of a good polished surface are easily achieved. Also, an appropriate aggregate can be formed by an appropriate interaction between the OH group of the silica particle and the water-soluble polymer. The formulation amount of this water-soluble polymer is more preferably 0.0005 to 2% by mass relative to the total amount of the polishing composition, and more preferably 0.05 to 10% by mass relative to the silica particle.

Examples of the water-soluble polymer include water-soluble cellulose, water-soluble vinyl polymers, and polyhydric alcohol polymers. Specific examples of the water-soluble cellulose include hydroxymethyl cellulose, hydroxyethyl cellulose, hydroxypropyl cellulose, carboxymethyl cellulose, hydroxyethyl methyl cellulose, hydroxypropyl methyl cellulose, methyl cellulose, ethyl cellulose, ethyl hydroxyethyl cellulose, and carboxymethyl ethyl cellulose. Examples of the water-soluble vinyl polymers include polyvinyl alcohol, polyvinyl pyrrolidone, and carboxyvinyl polymers. Among these, hydroxyethyl cellulose and polyvinyl pyrrolidone are preferable. Examples of the polyhydric alcohol polymers include polyvinyl alcohol, poly(2-propenol), poly(ethylene-1,2-diol), poly(propylene-1,2-diol), poly(propylene-1,3-diol), poly(butadiene-1,4-diol), poly(butadiene-1,3-diol), and poly(butadiene-2,3-diol). These may be used independently or in appropriate combinations.

The concentration of the silica particle in the polishing composition is preferably 0.1 to 50% by mass. When the concentration of the silica particle is less than 0.1% by mass, the polishing rate sometimes decreases depending on the types of the substrate and the insulating film. Conversely, when the concentration of the silica particle exceeds 50% by mass, the stability of the polishing composition is insufficient. This inhibits further improvement of the polishing rate and the polishing efficiency. Also, in this case, a dried product sometimes occurs and adheres in a process of supplying the polishing composition for a polishing treatment. The adhering dried product sometimes causes scratches to occur. The silica particle concentration is more preferably 0.2 to 30% by mass.

[Production Method of Silica Particle Dispersion Liquid]

A production method of a silica particle dispersion liquid according to the present embodiment will be described.

First, a silica particle dispersion liquid containing a silica particle having a prescribed size is prepared by hydrolyzing and polycondensing alkoxysilane in the presence of water, an organic solvent, and an alkali catalyst (silica particle dispersion liquid preparation process). Subsequently, the organic solvent in this silica particle dispersion liquid is substituted with water (water substitution process). Furthermore, the silica particle dispersion liquid obtained by substituting with water is heated under normal pressure at pH 7 or more such that the Sears number Y of the silica particle does not become 12.0 or less (particle surface adjustment process). Thereafter, the dispersion liquid obtained in this particle surface adjustment process is concentrated at less than pH 7 (concentration process).

Such a production method enables easy production of a dispersion liquid containing, at a high concentration, a silica particle that can occlude a basic substance and that contains a desired amount of an OH group. That is, a dispersion liquid containing a silica particle satisfying (i) to (iii) described above can be produced. Also, the present production method may include an additional process. Unless otherwise stated, the pH is a value converted at 25° C.

Hereinafter, each process will be described in detail.

[Dispersion Liquid Preparation Process]

Here, a silica particle is formed by hydrolyzing and polycondensing alkoxysilane as a raw material in the presence of water, an organic solvent, and an alkali catalyst, and a silica particle dispersion liquid containing a silica particle having an average particle diameter d of 5 to 300 nm is prepared.

The alkoxysilane may be one or two or more of the alkoxysilanes represented by [Formula 2] below.

$$X_nSi(OR)_{4-n} \qquad [\text{Formula 2}]$$

Here, X represents a hydrogen atom, a fluorine atom, or an alkyl group, an aryl group, or a vinyl group of 1 to 8 carbons. R represents a hydrogen atom, or an alkyl group, an aryl group, or a vinyl group of 1 to 8 carbons. n is an integer of 0 to 3.

Examples of the alkoxysilanes represented by Formula [2] include tetramethoxysilane, tetraethoxysilane, tetraisopropoxysilane, tetrabutoxysilane, tetraoctoxysilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trimethylmethoxysilane, trimethylethoxysilane, trimethylisopropoxysilane, trimethylbutoxysilane, trifluoromethyltrimethoxysilane, and trifluoromethyltriethoxysilane.

Here, preferable alkoxysilanes are those having a short alkyl chain, such as tetramethoxysilane (TMOS) and tetraethoxysilane (TEOS). These alkoxysilanes are fast in hydrolysis rate and grow in a three-dimensional manner. Therefore, with the use of these alkoxysilanes, a particle having a low density is likely to be obtained.

There are the following two examples of a method of preparing the dispersion liquid of the silica particle through the hydrolysis of alkoxysilane.

(Method I) A method of adding a mixed solution of alkoxysilane and an organic solvent to a liquid containing water, an organic solvent, and a catalyst in a container.

(Method II) A method of adding a liquid A containing alkoxysilane and a liquid B containing a catalyst and water to a liquid substantially consisting of an organic solvent in a container.

Here, the liquid A in Method II may contain an organic solvent. The phrase "substantially consisting of an organic solvent" indicates that impurities or the like inevitably contained from the production process of the organic solvent may be contained, but nothing other than the impurities or the like is contained. For example, the concentration of the organic solvent in the liquid substantially consisting of an organic solvent is 99% by mass or more, and preferably 99.5% by mass or more.

The hydrolysis of alkoxysilane is usually performed under normal pressure at a temperature that is not higher than the boiling point of a used solvent. It is noted that both methods can also adopt a so-called seed method of previously adding a prepared seed particle into a liquid in a container.

In the present embodiment, it is preferable to prepare a low density particle in the dispersion liquid preparation process in order to finally obtain a particle that can occlude a large amount of a basic substance. Therefore, it is preferable that the particle is prepared at a low temperature for a short time (grown rapidly). This can provide a porous particle that has sufficient pores to occlude a basic substance and that has a large Sears number.

Specifically, for example, the reaction temperature is preferably lower than 20° C., and more preferably 18° C. or lower. Also, a time involved in the growth of the particle is preferably within 60 minutes, and more preferably within 30 minutes.

Also, in the present process, it is preferable that the particle is prepared in consideration of the growth rate of the particle in order to obtain a particle that can occlude a large amount of a basic substance.

(Growth Rate of Particle)

Generation of a new nuclear particle during the process can be suppressed by optimizing the condition of the dispersion liquid preparation process. Accordingly, the growth of an originally generated particle proceeds with the particle as a nucleus only on the surface of the particle. Therefore, the added amount of alkoxysilane and the volume of the obtained particle correlate with each other.

Thus, a relationship between the added amount of alkoxysilane and the average particle diameter d comes to be as below. It is noted that a is a factor for the particle growth curve.

$$\text{Average particle diameter } d = a \times (\text{alkoxysilane addition amount})^{1/3} \quad \text{[Formula 3]}$$

When the addition rate of alkoxysilane during particle growth is constant, (alkoxysilane addition amount) can be replaced with (addition time) and expressed as below. It is noted that a' is a factor for the particle growth curve.

$$\text{Average particle diameter } d = a' \times (\text{alkoxysilane addition time})^{1/3} \quad \text{[Formula 4]}$$

Figure 2:
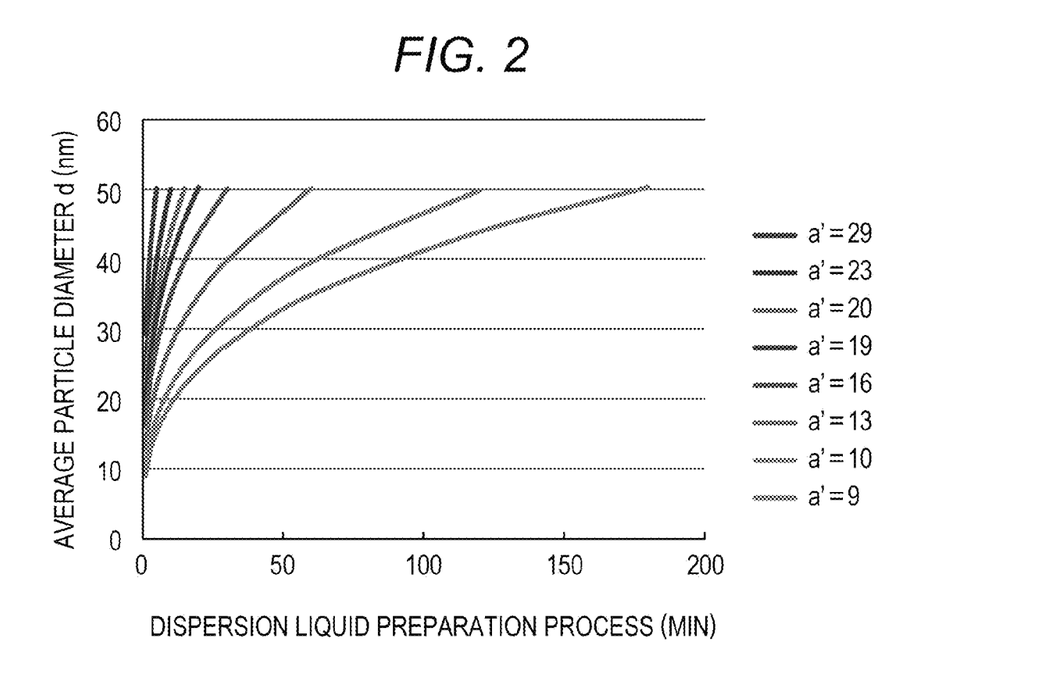
FIG. 2 is a graph illustrating a growth curve of a particle in a dispersion liquid preparation process, in which a'=29 for the leftmost curve and a'=9 for the rightmost curve.

In the above-described formula, the faster the growth of the particle, the larger the value of the factor a'. FIG. 2 illustrates specific particle growth curves based on [Formula 4].

When the number of nuclear particles is identical, the faster the growth rate of the particle, the looser the network inside the particle. It is considered that this enables the particle to occlude a larger amount of a basic substance.

Therefore, for obtaining an intended particle that can occlude a large amount of a basic substance, for example, the factor a' in [Formula 4] for a particle of d=50 nm is preferably 15 or more, more preferably 20 or more, and further preferably 25 or more. For a particle of d=30 nm, the factor a' is preferably 9 or more, more preferably 12 or more, and further preferably 15 or more.

In this manner, a preferable factor a' varies depending on the average particle diameter d. Therefore, when b is a value obtained by dividing the value of the factor a' by the average particle diameter d, and b=0.3 to 0.6 in the range of the average particle diameter of d=5 to 300 nm, the intended particle is likely to be obtained.

The Sears number Y of the silica particle tends to decrease in the subsequent process. Therefore, in the present process, a silica particle having a Sears number Y larger than the Sears number Y of the silica particle as a final product is prepared. The Sears number Y of the silica particle prepared in the present process is preferably 40 or more. Accordingly, the Sears number Y of the silica particle as a final product can be adjusted to a value exceeding 12.0, even when a subsequent treatment necessary for use, such as solvent substitution with water or concentration adjustment, has been performed. The Sears number Y of the silica particle prepared in the present process is more preferably 60 or more, further preferably 70 or more, and particularly preferably 80 or more.

Examples of the organic solvent include alcohols, ketones, ethers, and esters. More specific examples include alcohols such as methanol, ethanol, propanol, and butanol, ketones such as methyl ethyl ketone and methyl isobutyl ketone, glycol ethers such as methyl Cellosolve, ethyl Cellosolve, and propylene glycol monopropyl ether, glycols such as ethylene glycol, propylene glycol, and hexylene glycol, and esters such as methyl acetate, ethyl acetate, methyl lactate, and ethyl lactate. Among these, methanol or ethanol is more preferable, and methanol is particularly preferable. These organic solvents may be used individually, or a mixture of two or more thereof may be used.

As the alkali catalyst, a basic substance is used. Examples of the basic substance include ammonia, amine, alkali metal hydrides, alkali earth metal hydrides, alkali metal hydroxides, alkali earth metal hydroxides, quaternary ammonium compounds, and amine-based coupling agents. These catalysts can be used independently or in combinations. Ammonia is preferable, which depends on the use condition, the use amount, and the like.

Ammonia does not contain an organic group in its structure. Therefore, an organic group is less likely to coat the OH group on the particle surface when ammonia is processed into a polishing composition. Accordingly, ammonia is less likely to inhibit the interaction between the particle and the additive. Also, handling of ammonia during production is easy, and excess ammonia can be easily discharged outside the system by heating or the like. This also facilitates adjustment of the amount of ammonia remaining in the dispersion liquid. Furthermore, unlike alkali metal hydrides, alkali earth metal hydroxides, alkali metal hydroxides, and alkali earth metal hydroxides, ammonia does not contain a metal element which has the risk to influence the insulation properties or the like of the circuit of the polished substrate. Ammonia is also preferable in this regard.

The amount of the catalyst used for hydrolysis is preferably 0.005 to 2.0 mol per 1 mol of alkoxysilane. When the amount of the catalyst is less than 0.005 mol, hydrolysis is less likely to be caused, and thus there is a risk that the particle size distribution may be widened. Conversely, when the amount of the catalyst exceeds 2.0 mol, the hydrolysis speed significantly increases. Accordingly, there is a risk that the particle is less likely to be formed, and a gelled product may be formed. The amount of the catalyst to be added is preferably 0.01 to 1.5 mol per 1 mol of alkoxysilane.

The amount of water used for hydrolysis, per 1 mol of an Si—OR group constituting alkoxysilane, is preferably 0.5 to 10 mol, and more preferably 1 to 5 mol.

The silica particle concentration of the dispersion liquid is preferably less than 10% by mass, more preferably less than 8% by mass, and further preferably less than 5% by mass.

When hydrolysis is performed under the above-described conditions, polycondensation of alkoxysilane proceeds in a three-dimensional manner.

The average particle diameter d of the silica particle obtained in the present process is 5 to 300 nm. The average particle diameter d of the silica particle is preferably 5 to 100 nm, more preferably 10 to 80 nm, further preferably 20 to 60 nm, particularly preferably 25 to 55 nm, and most preferably 30 to 50 nm. It is noted that the average particle diameter of the silica particle as a final product is identical to the average particle diameter of the silica particle produced in the present process.

[Water Substitution Process]

In the water substitution process, the organic solvent in the silica particle dispersion liquid is substituted with water (pure water). The present process can be performed at an appropriate stage after the dispersion liquid preparation process. Especially, the present process is preferably performed before the particle surface adjustment process.

The method of water substitution is not particularly limited, as long as it is a method in which the organic solvent can be substituted with water (pure water). Examples of this method include a heating substitution method, a decompression substitution method, and a membrane substitution method. Among these, a heating substitution method is preferable, because it can be consecutively followed by the particle surface adjustment process. In this method, for example, the organic solvent is substituted with water by heating the dispersion liquid to evaporate the organic solvent while adding water to maintain the liquid amount constant. This method is preferably performed at normal pressure in terms of operation. It is noted that the organic solvent can be substituted with water without maintaining the liquid amount constant while concentrating the dispersion liquid, so that the present process also serves as the concentration process.

When the dispersion liquid is heated at normal pressure, water substitution may also be completed when the liquid temperature substantially reaches the boiling point (100° C.) of water. However, it is preferable that the liquid temperature is controlled such as not to reach 100° C. (not to come to the boil), in order to suppress generation of microgels or the like. In this method, for example, water substitution is completed when the dispersion liquid is heated for a prescribed time in a state in which the liquid temperature is maintained at about 90 to 96° C.

[Particle Surface Adjustment Process]

In the particle surface adjustment process, the silica particle dispersion liquid formed in the dispersion liquid preparation process is heated at pH 7 or more to adjust the content of the OH group of the silica particle. Here, the adjustment is performed so that the Sears number Y of the silica particle does not become 12.0 or less. For adjusting the Sears number Y of the silica particle to a desired value, the pH and the retention time are adjusted depending on the surface state of the silica particle prepared in the dispersion liquid preparation process. That is, the silica particle dispersion liquid is heated at a high pH for a long time in order to further reduce the Sears number Y. When the silica particle dispersion liquid is heated at less than pH 7, the content of the OH group of the silica particle is unlikely to change. The pH is preferably 7.5 or more, and more preferably 8 or more. Although the upper limit of the pH is not particularly limited, it is, for example, about 10.

For achieving a prescribed pH, alkali may be added before or during heating. However, when a prescribed pH has been already achieved, alkali may not be added. As alkali, the catalyst used in the above-described dispersion liquid preparation process can be used. The alkali species is preferably ammonia. This is because the use of ammonia facilitates the adjustment of pH, and ammonia does not contain an organic group and a metal element. There is a risk that an organic group may modify the silica particle to reduce the polishing performance and the stability of the dispersion liquid. Also, there is a risk that a metal element may have an influence on the insulation properties of the circuit of the polished substrate.

Here, in terms of satisfying both the achievement of a high polishing rate and the formation of a good polished surface, the Sears number Y of the silica particle is preferably adjusted to more than 12.0 and not more than 20.0.

The heating in the present process is preferably performed under normal pressure at a temperature lower than the boiling point of the dispersion medium such that the silica particle dispersion liquid does not come to the boil. This is because the generation of microgels, and furthermore, the enhancement of filtration properties and the suppression of the generation of defects on the polished substrate can be achieved by heating under the condition that the silica particle dispersion liquid does not come to the boil. For example, the silica particle dispersion liquid can be heated under normal pressure or under pressurization at a temperature lower than the boiling point of the dispersion medium. Specifically, heating at lower than 100° C. under normal pressure is preferable, and heating at 90 to 96° C. under normal pressure is more preferable.

Also, the present process may be performed either in a closed or open system. When the present process is performed in a closed system, discharge of alkali outside the system can be suppressed. Therefore, the OH group can be adjusted while maintaining the pH in the system. On the other hand, when the present process is performed in an open system, alkali is discharged outside the system as the solvent evaporates by heating, if ammonia, amine, or the like is used as alkali. Therefore, the present process is preferably performed in a closed system in which the pH is easily maintained, and the OH group can be more precisely adjusted.

[Concentration Process]

In the concentration process, the dispersion liquid obtained in the particle surface adjustment process is concentrated at less than pH 7. The lower limit of the pH is about 6.0. In the present process, the dispersion liquid is concentrated so as not to change the amount of the OH group prepared in the particle surface adjustment process. The present concentration process is performed after the particle surface adjustment process. However, a preliminary concentration process may be performed at an appropriate stage (for example, before the water substitution process) before the particle surface adjustment. The pH may be adjusted by ion exchange, ultrafiltration, or the like, or a combination thereof, other than the distillation of alkali by heating. The pH is preferably 6.9 or less, and more preferably 6.7 or less.

The concentration method is not particularly limited, as long as it is a method that can increase the silica concentration of the dispersion liquid. Examples of the concentration method include a heating concentration method, a decompression concentration method, and a film concentration method. Among these, a heating concentration method is preferable, because it can consecutively follow the previous process. In this method, for example, the dispersion liquid is concentrated by heating the dispersion liquid while adding the silica particle dispersion liquid as necessary so that the organic solvent and water evaporate.

In the heating concentration method, the Sears number Y (the amount of OH group) of the silica particle easily changes when the pH is 7 or more. Therefore, the pH is controlled within the above-described range. Also, heating is preferably performed under the condition that the dispersion medium of the dispersion liquid does not come to the boil. This is because the suppression of the generation of microgels, and furthermore, the enhancement of filtration properties and the suppression of the occurrence of defects on the polished substrate can be achieved by heating the dispersion liquid under the condition that it does not come to the boil. That is, the dispersion liquid is preferably heated under normal pressure at a temperature lower than the boiling point of the dispersion medium. Specifically, when the dispersion medium is water, the dispersion liquid is preferably heated at lower than 100° C. under normal pressure, and more preferably heated at 90 to 96° C. under normal pressure.

It is noted that in the particle surface adjustment process, the viscosity (converted in terms of a silica concentration of 20% by mass) of the dispersion liquid obtained in the dispersion liquid preparation process temporarily rises to, for example, 60 mPa·s or more. However, the viscosity of the dispersion liquid can be decreased by reducing the pH of the dispersion liquid to less than 7 during the course from the particle surface adjustment process to the concentration process. The dispersion liquid resulting through the process of decreasing the viscosity after the viscosity temporarily rose to 60 mPa·s or more is unlikely to contain an unreacted product. It is considered that this is because the surfaces of the particles in the dispersion liquid interact with each other in the course of the change in viscosity of the dispersion liquid, and densification proceeds. In this manner, a "silicon-containing compound" (unreacted product) can be reduced to 200 ppm or less through the particle surface adjustment process and the concentration process.

EXAMPLES

Hereinafter, examples of the present embodiment will be specifically described.
<Silica Particle Dispersion Liquid>

Synthetic Example 1

(Dispersion Liquid Preparation Process)

A raw material solution was prepared by mixing 432.0 g of tetramethoxysilane (manufactured by Tama Chemicals Co., Ltd. (the same applies hereinafter)) and 144.0 g of methanol. In a reaction tank, 5,400 g of a solvent in which methanol, water, and ammonia were previously mixed was charged. In this mixed solvent, the concentration of water was 15% by mass, and the concentration of ammonia was 1% by mass. The raw material solution was dropped into the reaction tank at a uniform rate for 20 minutes while adjusting the liquid temperature such that the temperature of the reaction solvent was maintained at 15° C. Accordingly, a silica particle dispersion liquid having a silica particle concentration of 2.9% by mass was obtained.
(Preliminary Concentration Process)

The dispersion liquid (silica particle concentration: 2.9% by mass) obtained in the dispersion liquid preparation process was concentrated by a heating concentration method. Specifically, the dispersion liquid obtained in the dispersion liquid preparation process was heated under normal pressure to evaporate the organic solvent and water, while a previously prepared silica particle dispersion liquid (silica particle concentration: 2.9% by mass) was added such that the liquid amount was constant. In this manner, the dispersion liquid was concentrated.
(Water Substitution Process)

The concentrated dispersion liquid was substituted with water under normal pressure by a heating substitution method while adding water to the dispersion liquid. The water substitution process was terminated when the liquid temperature reached 96° C.
(Particle Surface Adjustment Process)

After the water substitution process was terminated, the dispersion liquid was subjected to a heating treatment at pH 7 or more for 25 hours while maintaining the liquid temperature at 96° C. under normal pressure. In this process, heating was also continued while adding water in the same amount as the distilled liquid amount to maintain the silica concentration in the system constant. In this manner, the silica particle was adjusted to have an intended Sears number.
(Concentration Process)

It was confirmed that the pH was lower than 7, and the addition of water was terminated. Thereafter, the dispersion liquid was concentrated at 96° C. under normal pressure until the silica particle concentration reached 20% by mass. In this manner, a silica particle dispersion liquid A was prepared.

Table 1 illustrates the Sears number Y, particle density ρ, average particle diameter d, coefficient of variance (CV value) for the particle diameter, ratio of a linked particle constituted by two or more silica particles, amount of an unreacted product, and occlusion amount of a basic substance of the dispersion liquid at the termination of the concentration process (the same applies in the following Synthetic Examples and Synthetic Comparative Examples). Various parameters were measured in the following methods.
<<Silica Particle Concentration of Dispersion Liquid>>

Five grams of a sample was dried at 150° C. for 1 hour. From the mass of the dried sample, the solid content concentration was calculated. A silica particle concentration was calculated from a value obtained by subtracting, from this solid content concentration, the later described value obtained by converting the metal element content of the silica particle in terms of oxides and the amount of an unreacted product.
<<Average Particle Diameter d of Silica Particle>>

An electron micrograph of silica particles was taken. Furthermore, the longest primary particle diameter for each of optional 100 particles was measured as exemplified in FIG. 1. An average value of the measured results was calculated as an average particle diameter d of the silica particles.
<<Sears Number Y of Silica Particle>>

The Sears number Y was measured by titration with sodium hydroxide as described by Sears in Analytical Chemistry 28(1956), 12, 1981-1983.

Specifically, 30 g of sodium chloride was added to 150 g of a sample diluted with pure water, such that the silica particle concentration became 1% by mass. The pH was adjusted to 4.0 with hydrochloric acid. Thereafter, the sample was titrated with a 0.1 N aqueous sodium hydroxide solution. The Sears number Y was represented by the titration amount of the aqueous sodium hydroxide solution used for the pH of the sample to reach 9.0 (that is, the Sears number Y is the titration amount of the 0.1 N aqueous sodium hydroxide solution to 1.5 g of silica). The titration with the 0.1 N aqueous sodium hydroxide solution was performed at a fixed titration rate of 0.1 ml/sec, using an automatic titrator.

<<Density of Silica Particle>>

The particle density ρ is obtained from the specific surface area (SA=32×(Sears number)−25) based on the above-described average particle diameter d and the above-described Sears number Y.

From the particle diameter d [nm], a surface area (S) per particle and a volume (V) per particle are obtained as follows:

surface area ($S$) per particle=$4\pi(d/2)^2=\pi d^2$ [nm²/particle], and volume ($V$) per particle=$(4/3)\pi(d/2)^3=(\pi d^3)/6$ [nm³/particle].

When the particle density is ρ [g/cm³], the specific surface area SA is obtained as follows:

SA [m²/g]=$1000 \cdot S/\rho V=(1000/\rho) \cdot (6/d)=6000/\rho d$.

Therefore, ρ [g/cm³] is obtained from SA [m²/g] and d [nm] according to the following formula:

ρ [g/cm³]=$6000/SA \cdot d$.

<<Coefficient of Variance for Particle Diameter of Silica Particle>>

The coefficient of variance for the particle diameter was obtained according to the following formula. It is noted that the particle diameter of each particle and the average particle diameter used for obtaining the coefficient of variance (CV value) for the particle diameter were values obtained from the above-described electron micrograph.

CV value=(standard variation of particle diameter (σ)/average particle diameter ($D_x$))×100 standard variation of particle diameter (σ)=$[\Sigma(D_i-D_x)^2/(n-1)]^{1/2}$     [Mathematical Formula 1]

$D_i$: particle diameter, n: 100

<<Ratio of Linked Particle>>

An electron micrograph of silica particles was taken. Optional 100 particles were checked on the existence or absence of linkage, and grouped into an unlinked particle, a linked particle constituted by two silica particles, and a linked particle constituted by three or more silica particles. For each group, the number of particles was counted, and the ratio of the linked particle constituted by two silica particles to the total number of particles was calculated.

<<Amount of Unreacted Product in Dispersion Liquid>>

Using a micro ultracentrifuge (CS150GXL manufactured by Hitachi Koki Co., Ltd.), the dispersion liquid was centrifuged at a set temperature of 30° C. and 137,000 rpm (1,000,000 G) for 30 minutes. A "silicon-containing compound" (unreacted product) other than silica particles present in the supernatant of this treated liquid was measured as Si by an ICP emission analyzer (ICPS-8100 manufactured by Shimadzu Corporation). This measured value was converted into the $SiO_2$ concentration in the dispersion liquid to obtain the amount of an unreacted product.

<<Evaluation of Adsorption Amount of Basic Substance>>

The silica particle dispersion liquid was adjusted with 28% ammonia water and pure water such that the silica particle concentration became 9.0% by mass, and the pH became 9.0. This dispersion liquid was centrifuged, and the ammonia amount in the dispersion liquid (entirety) before the centrifugation and the ammonia amount in the supernatant of the dispersion liquid after the centrifugation were quantified. A difference between these amounts was obtained as the ammonia amount occluded by the silica particle. This amount was converted into an amount per 1 g of the particle to obtain the occlusion amount of ammonia (occlusion amount of a basic substance). For the centrifugation, a micro ultracentrifuge (CS150GXL manufactured by Hitachi Koki Co., Ltd.) was used to centrifuge the dispersion liquid at a set temperature of 30° C. and 137,000 rpm (1,000,000 G) for 30 minutes.

<<Metal Element Content of Silica Particle>>

The contents of alkali metal, alkali earth metal, Fe, Ti, Zn, Pd, Ag, Mn, Co, Mo, Sn, Al, and Zr, the contents of Cu, Ni, and Cr, and the contents of U and Th in the silica particle were measured in the following manner. First, the silica particle was dissolved with hydrofluoric acid and heated to remove the hydrofluoric acid. Thereafter, pure water was added to the dissolved silica particle as necessary to obtain a solution. The above-described contents were obtained by measuring this solution using an ICP-MS inductively coupled plasma mass analyzer (7900s manufactured by Agilent Technologies, Inc.).

<<Sphericity of Primary Particle of Silica Particle>>

An electron micrograph was taken. Furthermore, a ratio (DS/DL) between a largest diameter (DL) and a short diameter (DS) orthogonal to the largest diameter (DL) was obtained for each of optional 100 particles. Furthermore, an average value of the ratios (DS/DL) was calculated to obtain a sphericity. It is noted that the sphericity was calculated from an unlinked particle.

Synthetic Example 2

A silica particle dispersion liquid B was prepared in the same method as in Synthetic Example 1, except that the water substitution process was performed under reduced pressure (−0.06 MPa (in gauge pressure)).

Synthetic Example 3

(Dispersion Liquid Preparation Process)

A raw material solution was prepared by mixing 388.8 g of tetramethoxysilane and 129.6 g of methanol. In a reaction tank, 5,400 g of a solvent in which methanol, water, and ammonia were previously mixed was charged. In this mixed solvent, the concentration of water was 15% by mass, and the concentration of ammonia was 1% by mass. The raw material solution was dropped into the reaction tank at a uniform rate for 18 minutes while adjusting the liquid temperature such that the temperature of the reaction solvent was maintained at 13° C. Accordingly, a silica particle dispersion liquid having a silica particle concentration of 2.6% by mass was obtained.

(Preliminary Concentration Process)

The dispersion liquid (silica particle concentration: 2.6% by mass) obtained in the dispersion liquid preparation process was concentrated by a heating concentration method. Specifically, the dispersion liquid obtained in the dispersion liquid preparation process was heated under normal pressure to evaporate the organic solvent and water, while a previously prepared silica particle dispersion liquid (silica concentration: 2.6% by mass) was added such that the liquid amount was constant. In this manner, the dispersion liquid was concentrated.

A silica particle dispersion liquid C was obtained in the same method as in Synthetic Example 1 in and after the water substitution process.

Synthetic Example 4

(Dispersion Liquid Preparation Process)

A raw material solution was prepared by mixing 345.6 g of tetramethoxysilane and 115.2 g of methanol. In a reaction tank, 5,400 g of a solvent in which methanol, water, and ammonia were previously mixed was charged. In this mixed solvent, the concentration of water was 15% by mass, and the concentration of ammonia was 1% by mass. The raw material solution was dropped into the reaction tank at a uniform rate for 16 minutes while adjusting the liquid temperature such that the temperature of the reaction solvent was maintained at 12.0° C. Accordingly, a silica particle dispersion liquid having a silica particle concentration of 2.3% by mass was obtained.

(Preliminary Concentration Process)

The dispersion liquid (silica particle concentration: 2.3% by mass) obtained in the dispersion liquid preparation process was concentrated by a heating concentration method. Specifically, the dispersion liquid obtained in the dispersion liquid preparation process was heated under normal pressure to evaporation the organic solvent and water, while a previously prepared silica particle dispersion liquid (silica concentration: 2.3% by mass) was added such that the liquid amount was constant. In this manner, the dispersion liquid was concentrated.

A silica particle dispersion liquid D was obtained in the same method as in Synthetic Example 1 in and after the water substitution process.

In the silica particle according to any one of Synthetic Examples, the content of each of alkali metal, alkali earth metal, Fe, Ti, Zn, Pd, Ag, Mn, Co, Mo, Sn, Al, and Zr was less than 0.1 ppm, the content of each of Cu, Ni, and Cr was less than 1 ppb, and the content of each of U and Th was less than 0.3 ppb. Also, the sphericity of the primary particle of the silica particle was 0.80 to 1.00.

Synthetic Example 5

(Dispersion Liquid Preparation Process)

A raw material solution was prepared by mixing 648 g of tetramethoxysilane and 216 g of methanol. In a reaction tank, 5,400 g of a solvent in which methanol, water, and ammonia were previously mixed was charged. In this mixed solvent, the concentration of water was 15% by mass, and the concentration of ammonia was 1% by mass. The raw material solution was dropped into the reaction tank at a uniform rate for 30 minutes while adjusting the liquid temperature such that the temperature of the reaction solvent was maintained at 20° C. Accordingly, a silica particle dispersion liquid having a silica particle concentration of 4.1% by mass was obtained.

(Preliminary Concentration Process)

The dispersion liquid (silica particle concentration: 4.1% by mass) obtained in the dispersion liquid preparation process was concentrated by a heating concentration method. Specifically, the dispersion liquid obtained in the dispersion liquid preparation process was heated under normal pressure to evaporate the organic solvent and water, while a previously prepared silica particle dispersion liquid (silica concentration: 4.1% by mass) was added such that the liquid amount was constant. In this manner, the dispersion liquid was concentrated.

A silica particle dispersion liquid E was obtained in the same method as in Synthetic Example 2 in and after the water substitution process.

Synthetic Comparative Example 1

(Dispersion Liquid Preparation Process)

To a mixed liquid of 440.8 g of pure water, 135.0 g of 28% ammonia water, and 3669.0 g of methanol, there were added a mixed liquid of 3044.4 g of tetramethoxysilane and 229.2 g of methanol and a mixed liquid of 621.0 g of pure water and 134.9 g of 28% ammonia water at a liquid temperature maintained at 30° C. over 150 minutes. Accordingly, a silica particle dispersion liquid having a silica particle concentration of 14.5% was obtained.

(Water Substitution Process)

The preliminary concentration process was not performed. The dispersion liquid obtained in the dispersion liquid preparation process was substituted with water under normal pressure by a heating substitution method, while adding water to the dispersion liquid. The water substitution process was terminated when the liquid temperature reached 96° C.

A silica particle dispersion liquid F was obtained in the same method as in Synthetic Example 1 thereafter.

Synthetic Comparative Example 2

A silica particle prepared by a water glass method (SI-45P manufactured by JGC Catalysts and Chemicals Ltd.) was used as Synthetic Comparative Example 2.

In the silica particle according to Synthetic Comparative Example 1, the content of each of alkali metal, alkali earth metal, Fe, Ti, Zn, Pd, Ag, Mn, Co, Mo, Sn, Al, and Zr was less than 0.1 ppm, the content of each of Cu, Ni, and Cr was less than 1 ppb, and the content of each of U and Th was less than 0.3 ppb. Also, in any one of Synthetic Comparative Examples, the sphericity of the primary particle of the silica particle was 0.80 to 1.00.

<Polishing Composition>

Example 1

The silica particle dispersion liquid A and a water-soluble polymer (hydroxyethyl cellulose (molecular weight: 350000)) were mixed at the ratio illustrated in Table 2 to obtain a polishing composition A having a silica particle concentration of 0.45% by mass. To the polishing composition, 0.02% by mass of ammonia was formulated.

Example 2

A polishing composition B was prepared in the same method as in Example 1, except that the silica particle dispersion liquid B was used in place of the silica particle dispersion liquid A.

Example 3

A polishing composition C was prepared in the same method as in Example 1, except that the silica particle dispersion liquid C was used in place of the silica particle dispersion liquid A.

Example 4

A polishing composition D was prepared in the same method as in Example 1, except that the silica particle dispersion liquid D was used in place of the silica particle dispersion liquid A.

Example 5

A polishing composition E was prepared in the same method as in Example 1, except that the silica particle dispersion liquid E was used in place of the silica particle dispersion liquid A.

Comparative Example 1

A polishing composition F was prepared in the same method as in Example 1, except that the silica particle dispersion liquid F was used in place of the silica particle dispersion liquid A.

Table 2 illustrates judgments of polishing properties (polishing rate, smoothness, and defects). The measured values were obtained in the following methods.

<Evaluation of Polishing Composition>
1. Polishing Rate

A substrate to be polished (single crystal silicon wafer having the crystal structure of 1.0.0) was set in a polishing device (NF300 manufactured by Nano Factor Inc.). The substrate to be polished was polished for 5 minutes using a Politex P103 polishing pad driven at a polishing load of 0.05 MPa, a table rotation speed of 50 rpm, and a spindle speed of 50 rpm with the above-described polishing composition supplied at a rate of 100 ml/min. Then, the substrate was washed with pure water and thereafter air-dried. The polishing rate of this substrate was evaluated according to the following criteria.

<<Judgment Method of Polishing Rate>>
Good: more than 25 nm/min
Fair: 20 to 25 nm/min
Poor: less than 20 nm/min 2. State of Polished Surface Using a scanning white light interferometer (Zygo New View 7300), the waviness on the polished surface of the obtained polished substrate was evaluated at a wavelength of 50 to 500 μm. The surface smoothness was evaluated according to the following criteria (waviness).

<<Judgment Method of Polished Surface Smoothness>>
Good: Waviness is less than 0.5 nm.
Fair: Waviness is not less than 0.5 nm and less than 1.0 nm.
Poor: Waviness is not less than 1.0 nm.

Using a laser microscope (VK-X250 manufactured by Keyence Corporation), the degree of defects such as scratches generated on the polished substrate was checked. Defects were evaluated according to the following criteria.

<<Judgment Method of Defects>>
Good: Defects are hardly observed.
Fair: Defects are slightly observed.
Poor: Defects are observed in a wide range.

TABLE 1

| Synthesis of dispersion liquid | Silica particle dispersion liquid | b (a'/d) | Sears number Y of each process | | | | Sears number Y | Physical properties of silica particle dispersion liquid | | | | | |
|---|---|---|---|---|---|---|---|---|---|---|---|---|---|
| | | | Dispersion liquid preparation process | Water substitution process | Particle surface adjustment process | Concentration process | | Particle density ρ (g/cm³) | Average particle diameter d (nm) | Coefficient of variance for particle diameter (CV value) (%) | Ratio of linked particle of two or more particles (%) | Amount of unreacted product (mass %) | Occlusion amount of basic substance (mg/g) |
| Synthetic Example 1 | A | 0.37 | 80 | 21 | 13 | 13 | 13 | 0.3 | 50 | 6 | 25 | 150 | 2.8 |
| Synthetic Example 2 | B | 0.37 | 80 | 28 | 17 | 17 | 17 | 0.2 | 50 | 6 | 25 | 140 | 3.5 |
| Synthetic Example 3 | C | 0.41 | 90 | 25 | 15 | 15 | 15 | 0.3 | 50 | 7 | 27 | 160 | 3.2 |
| Synthetic Example 4 | D | 0.41 | 100 | 30 | 19 | 19 | 19 | 0.2 | 50 | 7 | 30 | 170 | 3.7 |
| Synthetic Example 5 | E | 0.32 | 50 | 25 | 14 | 14 | 14 | 0.3 | 50 | 5 | 20 | 140 | 3.0 |
| Synthetic Comparative Example 1 | F | 0.19 | 35 | 10.5 | — | 10.5 | 10.5 | 0.4 | 50 | 6 | 25 | 150 | 1.9 |
| Synthetic Comparative Example 2 | SI-45P | | | | | | 3 | 1.5 | 57 | 5 | 0 | 110 | 0.2 |

TABLE 2

| | Polishing composition | Silica particle | Formulation amount of Water-soluble polymer (to silica mass %) | Concentration in polishing composition (mass %) | | | Polishing properties | | |
|---|---|---|---|---|---|---|---|---|---|
| | | | | pH | Silica particle | Water-soluble polymer | Polishing rate | Polished surface smoothness | Defects |
| Example 1 | A | A | 2 | 10.1 | 0.45 | 0.005 | Good | Good | Good |
| Example 2 | B | B | 2 | 10.1 | 0.45 | 0.005 | Good | Good | Good |
| Example 3 | C | C | 2 | 10.1 | 0.45 | 0.005 | Good | Good | Good |
| Example 4 | D | D | 2 | 10.1 | 0.45 | 0.005 | Good | Good | Good |

TABLE 2-continued

| | Polishing composition | Silica particle | Formulation amount of Water-soluble polymer (to silica mass %) | pH | Concentration in polishing composition (mass %) | | Polishing properties | | |
| | | | | | Silica particle | Water-soluble polymer | Polishing rate | Polished surface smoothness | Defects |
|---|---|---|---|---|---|---|---|---|---|
| Example 5 | E | E | 2 | 10.1 | 0.45 | 0.005 | Good | Good | Good |
| Comparative Example 1 | F | F | 2 | 10.1 | 0.45 | 0.005 | Fair | Fair | Fair |

What is claimed is:

1. A silica particle dispersion liquid, which is used for polishing, comprising a silica particle that satisfies (i) to (iv) below: (i) an average particle diameter d is 5 to 300 nm; (ii) an occlusion amount of a basic substance per 1 g of the particle is 2 mg or more; (iii) a Sears number Y exceeds 12.0; (iv) a density p of 1.00 g/cm3 or less; and a coefficient of variance for the average particle diameter d of the silica particle is 10% or less, wherein the silica particle has a plurality of pores that occludes the basic substance.

2. The silica particle dispersion liquid according to claim 1,
wherein the Sears number Y of (iii) is more than 12.0 and not more than 20.0.

3. The silica particle dispersion liquid according to claim 1,
wherein the silica particle has a structure in which a surface of the particle communicates with a pore inside the particle.

4. A production method of a silica particle dispersion liquid of claim 1, comprising:
preparing a silica particle dispersion liquid containing a silica particle having an average particle diameter d of 5 to 300 nm and a Sears number Y or 40 or more by hydrolyzing and polycondensing alkoxysilane in the presence of water, an organic solvent, and an alkali catalyst under a reaction temperature is lower than 20° C., and a time involved in growth of the particle is within 30 minutes;
substituting the organic solvent in the silica particle dispersion liquid with water;
heating, under normal pressure at pH 7 or more, the silica particle dispersion liquid obtained by substituting with water such that the Sears number Y of the silica particle does not become 12.0 or less; and
concentrating, at less than pH 7, the dispersion liquid obtained by heating.

5. The production method according to claim 4,
wherein the heating includes adjusting adjusting the Sears number Y of the silica particle to more than 12.0 and not more than 20.0.

6. The production method according to claim 4,
wherein the time involved in growth of the particle is within 20 minutes.

* * * * *